(12) United States Patent
Morris et al.

(10) Patent No.: US 6,821,028 B2
(45) Date of Patent: Nov. 23, 2004

(54) OPTICAL AND MECHANICAL INTERFACE BETWEEN OPTO-ELECTRONIC DEVICES AND FIBERS

(75) Inventors: James E. Morris, Charlotte, NC (US); William Hudson Welch, Charlotte, NC (US); Patricia Lee, Charlotte, NC (US); Darrell Childers, Hickory, NC (US); Russell Granger, Vale, NC (US); Eric Childers, Hickory, NC (US)

(73) Assignee: Digital Optics Corp., Charlotte, NC (US)

( * ) Notice: Subject to any disclaimer, the term of this patent is extended or adjusted under 35 U.S.C. 154(b) by 7 days.

(21) Appl. No.: 10/231,487

(22) Filed: Aug. 30, 2002

(65) Prior Publication Data

US 2004/0057678 A1 Mar. 25, 2004

(51) Int. Cl.⁷ .................................................. G02B 6/42
(52) U.S. Cl. ............................. 385/92; 385/52; 385/49; 385/88; 385/89
(58) Field of Search .......................... 385/92, 93, 89, 385/88, 49, 52

(56) References Cited

U.S. PATENT DOCUMENTS

| | | | | |
|---|---|---|---|---|
| 4,995,695 | A | * | 2/1991 | Pimpinella et al. ........... 385/49 |
| 5,359,208 | A | | 10/1994 | Katsuki |
| 5,586,207 | A | | 12/1996 | Goodwin |
| 5,768,456 | A | | 6/1998 | Knapp |
| 5,781,682 | A | | 7/1998 | Cohen |
| 5,790,730 | A | | 8/1998 | Kravitz et al. |
| 5,913,002 | A | | 6/1999 | Jiang |
| 5,940,562 | A | | 8/1999 | Henson |
| 6,318,909 | B1 | * | 11/2001 | Giboney et al. .............. 385/90 |
| 6,493,489 | B2 | * | 12/2002 | Mertz et al. .................. 385/52 |

* cited by examiner

*Primary Examiner*—David V. Bruce
*Assistant Examiner*—Krystyna Suchecki
(74) *Attorney, Agent, or Firm*—Susan S. Morse

(57) ABSTRACT

An interface system includes separate optical and mechanical interfaces between opto-electronic devices and fibers. This allows each of these components to be optimized for their particular function. The mechanical interface includes an aperture through which light is transmitted between the fibers and optical element on the optical interface. Protruding features on the optical interface mate with the aperture in the mechanical interface to align the optics block with the mechanical interface.

18 Claims, 3 Drawing Sheets

OPTICAL AND MECHANICAL INTERFACE BETWEEN OPTO-ELECTRONIC DEVICES AND FIBERS

CROSS-REFERENCE TO RELATED APPLICATIONS

The present application is related to application U.S. Ser. No. 10/171,621 filed Jun. 17, 2002, now U.S. Pat. No. 6,588,945, entitled "Interface Between Opto-Electronic Devices and Fibers", the entire contents of which are hereby incorporated by reference for all purposes.

BACKGROUND OF THE INVENTION

1. Field of the Invention

The present invention is directed to an interface system that interfaces opto-electronic devices and fibers, particularly using passively aligned optical elements and mechanical interface.

2. Description of Related Art

There are numerous ways to couple light to and from opto-electronic devices and fibers. One typical manner in which this is achieved is to butt couple the opto-electronic devices right up against the end faces of the fiber. Such butt-coupling requires active alignment to achieve desired levels of coupling efficiency. Further, butt-coupling does not allow the light beam to be modified. Finally, such butt-coupling typically requires close positioning of the opto-electronic devices in accordance with the spacing of the fibers, increasing crosstalk.

Another manner of achieving coupling between fibers and opto-electronic devices is to use short fibers, which in turn are coupled to the fibers. This allows surface emitting opto-electronic devices to be coupled with fibers, but still requires active alignment.

One passive alignment scheme proposed involves providing holes in all of the components to be aligned, e.g., a ferrule housing the fibers, a light coupling device including optics and a substrate including the opto-electronic devices. Pins are then inserted into the holes to realize alignment of all the elements. Such single shot alignment may not be accurate enough for all applications. Further, the materials that can be used for the light coupling device are limited when the holes need to be provided therein. Finally, such alignment requires that there be a linear relationship among all of the components.

SUMMARY OF THE PRESENT INVENTION

The present invention is therefore directed to an interface that substantially overcomes one or more of the problems due to the limitations and disadvantages of the related art.

It is an object of the present invention to provide a easily manufacturable scheme for aligning optical elements between opto-electronic devices and fibers.

It is another object of the present invention to use an existing feature in the system as part of the alignment of the optical elements.

At least one of the above and other objects may be realized by providing an interface system between an opto-electronic device and a fiber in a housing, the interface system including an optics block having at least one optical element formed therein for coupling light between the fiber and the opto-electronic device, a mechanical interface which aligns and mates the housing, the mechanical interface including an aperture between the optics block and the housing, light being transmitted between the optics block and the fiber through the aperture and the optics block, and mechanical alignment features on the optics block, the mechanical alignment features protruding from the optics block, at least one mechanical alignment feature on the optics block abutting with at least one sidewall of the aperture. The mechanical interface is separate from the optics block and the housing. At least part of the mechanical interface is disposed between the optics block and the housing. The mechanical interface includes a first surface to be positioned adjacent to the housing and a second surface, opposite the first surface, to be positioned adjacent to the optics block.

The mechanical alignment features may be formed lithographically. The interface mechanical alignment features may be at least approximately 100 microns high. The mechanical alignment features nay be made of a photoresist, e.g., SU-8. The sidewalls of the aperture may be tapered. The mechanical alignment features may surround the optics on the optics block. The mechanical alignment features may completely surround the optics on the optics block. The mechanical alignment features may extend longitudinally along the optics block. The mechanical alignment features may be in corners of the optics block. The mechanical alignment features may be in a longitudinal center of the optics block. The mechanical interface may be opaque to light being coupled between the opto-electronic device and the fiber. The mechanical alignment features may be of a different material than the optics block. The mechanical interface may further include alignment features for aligning the mechanical interface with the housing. Each sidewall of the aperture may be abutted by a mechanical alignment feature, least two sidewalls of the aperture may be abutted by a mechanical alignment feature, or only three sidewalls of the aperture may be abutted. The mechanical alignment features on the optics block may allow translation of the optics block when in the aperture.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION

Figure 1:
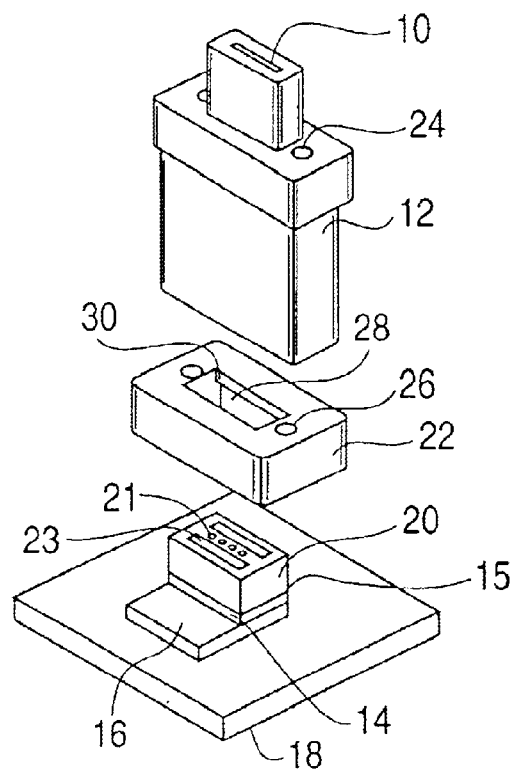
FIG. 1 is an exploded elevational perspective view of an interface of the present invention in conjunction with the fibers in a housing and the opto-electronic devices.

The present invention will be described in detail through embodiments with reference to accompanying drawings.

However, the present invention is not limited to the following embodiments but may be implemented in various types. The embodiments are only provided to make the disclosure of the invention complete and make one having an ordinary skill in the art know the scope of the invention. The thicknesses of various layers and regions are emphasized for clarity in accompanying drawings. Also, when a substrate is defined to exist on another layer or substrate, the substrate may exist directly on another layer or substrate, or an intermediate substrate or layer may be present therebetween. Throughout the drawings, the same reference numerals denote the same elements.

As can be seen in FIG. 1, the overall interconnect system includes a housing or ferrule 12 for receiving a plurality of fibers 10 therein, opto-electronic devices 14, an optics block 20 and a mechanical interface 22. The opto-electronic devices 14 are to be in communication with the fibers 10, optical elements 21 on the optics block 20 may include elements which collimate, focus and/or homogenize the light, and the mechanical interface 22 aligns and mates the optics block 20 and the housing 12. In this view and for this configuration, the opto-electronic devices are shown in outline form, since they will be obscured by a spacer 15 surrounding them.

The opto-electronic devices 14 may be provided on a silicon bench or sub-mount 16. In turn, this silicon bench 16 may be provided on a substrate 18. The optics block 20 may provide at least one optical element between each opto-electronic device 14 and a corresponding fiber 10. The optics block 20 may be spaced from the opto-electronic devices 14 by a spacer 15. Since the optics block has two surfaces, two optical elements may be provided thereon for each opto-electronic device/fiber pair. Further, if required, additional optics blocks may be bonded to and spaced from the optics block 20 to provide additional surfaces and/or spacing.

The bench 16 includes alignment features, not shown, thereon. The opto-electronic devices are provided on the bench 16 in accordance with the alignment features. Then, the spacer 15, if being used, also has alignment features thereon, which are aligned to the alignment features on the bench 16. The spacer 15 is then secured into place on the bench 16 in a conventional manner. Alignment features, not shown, on the optics block 20 are aligned with the corresponding features on the spacer 15 and/or the bench 16 to align the optics block 20 to the opto-electronic devices 14. The optics block 20 is then secured on the spacer 15 or the bench 16. The alignment features, not shown, on these elements may be fiducial marks or mechanical mating structures. In addition to or instead of having the spacer 15 align the optics block 20 to the alignment features on the bench 16, the mechanical interface 22 can provide the proper spacing between the optics block 20 and the opto-electronic devices 14. The mechanical interface may also have features thereon which align the optics block 20 to the alignment features on the bench 16. Either the spacer 15 or the mechanical interface 22 may surround the opto-electronic devices 14 to protect them from the environment.

The mechanical interface 22 includes an aperture 28 which allows light to travel between the opto-electronic devices 14 and the fibers 10 through the optical elements 21 on the optics block 20 without interference from the mechanical interface 22. The mechanical interface 22 may be aligned with the optics block 20 via mechanical alignment features 23 on the optics block 20. As can be seen more clearly in FIG. 2, these mechanical alignment features 23 mate with sidewalls 32 of the aperture 28. As shown in both FIGS. 1 and 2, the aperture 28 is provided in a lip 30 of the mechanical interface 22. This lip 30 may be provided to insure a desired separation between a top of the optics block 20 and an end face of the fibers 10. This lip 20 may also allow the mechanical interface 22 to surround the optics block 20 on all sides.

When the housing 12 containing the fibers 10 is to be aligned with the system, the opto-electronic devices 14, the optics block 20 and the mechanical interface 22 have already been aligned. The final alignment between the system and the housing 12 may be achieved by alignment features on both the mechanical interface 22 and the ferrule 12 housing the fibers 10. In the particular example shown, these alignment features consist of holes 24 in the ferrule 12, which are already typically present for aligning the ferrule with other devices, and alignment holes 26 in the mechanical interface 22. Once these alignment holes 24, 26 are aligned, an alignment pin, not shown, may then be inserted therein to maintain the aligned position.

The provision of separate elements to provide the mechanical interface and the optical interface provides several advantages. For example, the provision of the alignment holes 26 in the mechanical interface 22 allows the optics block 20 to be made of a material selected for its optical properties. For example, the optics block 20 may be made of glass, which is preferable for forming optics therein. However, provision of accurately formed cylindrical holes in glass is expensive. Further, for the creation of the optical elements on the optics block on the wafer level, if holes were to be provided in this same element as well, the yield of the number of optics block per wafer would decrease. Thus, the optics block is not that suitable if the holes had to be provided therein as well, i.e., if the mechanical and optical interface were to be realized by single element. Further, since the mechanical interface 22 is to accept the alignment pins, it must be of sufficient size to accommodate the pins. Glass may be too fragile for such a purpose. Finally, it is often advantageous to mold the pins directly into a part, e.g., using plastic. Thus, the system may be surface mounted or pluggable to an electrical interface.

The mechanical interface may similarly be made of a material best suited for its function. The aperture 28 allows the mechanical interface 22 to be made of any desired material, such as an opaque, thermally stable material in which holes may be accurately and easily formed, such as a glass filled plastic, ceramic or molded plastic, without regard to the optical properties thereof. If the mechanical interface 22 is made of a material which is transparent to wavelengths of light being exchanged between the fibers and the opto-electronic devices, such an aperture 28 exposing all of the optical elements 21 may no longer be needed. Some cut-out for receiving the alignment features 23 of the optics block 20, with the remaining portion serving as a spacer, may still be desirable. Either configuration will result in no physical contact between the fibers 10 and the optics block 20.

Figure 2:
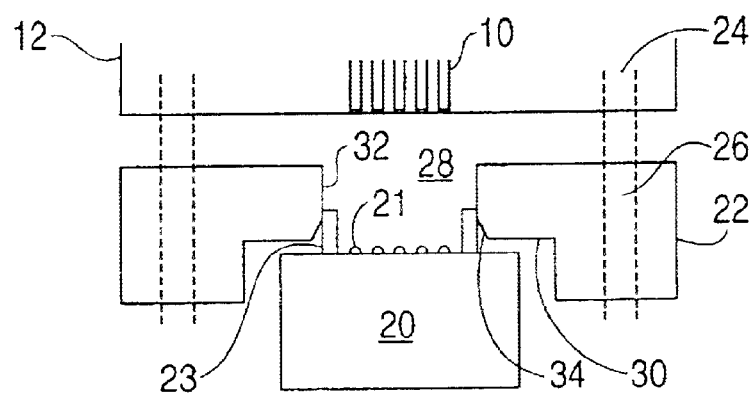
FIG. 2 is a cross-sectional detailed view of the fibers in a housing, the optics block and the mechanical interface piece.

The alignment between the optics block 20 and the mechanical interface 22 can be seen in the cross-sectional view of FIG. 2. As can be seen therein, the sidewalls 32 of the aperture 28 may have a tapered edge 34 for facilitating the insertion of the mechanical alignment features 23 of the optics block 20 therein. Since the optics block 20 extends further than the mechanical alignment features 23, the spacing between the optical elements 21 and the fibers 10 can be controlled by the height of the lip 30. Once the optics block 20 abuts the lip 30, it is secured in place.

There are clearly many configurations available for these mechanical alignment features on the optics block. The presence of the lip will provide the constraint in the z-direction. How the mechanical alignment features are constructed may provide constraint in both the z- and y-directions, considered fully constrained, provide constraint in only one of these directions, considered partially constrained, or require further translation in both the x- and y-directions.

As shown in FIG. 1, the mechanical alignment features 23 may be a pair of longitudinally extending bars. These bars extend substantially all the way along the sidewalls 32 of the length of the aperture 28. The bars are matched to the size of the opening, so that the bars abut the longitudinal side walls and the ends of the bars will abut the latitudinal sidewalls of the aperture 28. In other words, each bar abuts three sidewalls of the aperture. Thus, this configuration is fully constrained.

Figure 3A:
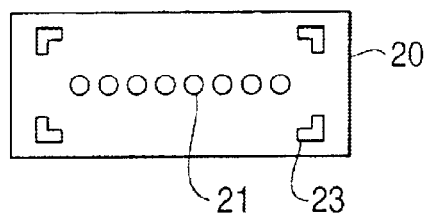
FIGS. 3A–3G are top views of different configuration of the mechanical alignment features on the optics block.
Figure 3B:
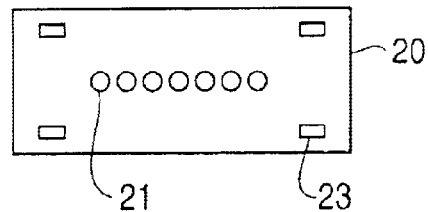
Figure 3C:
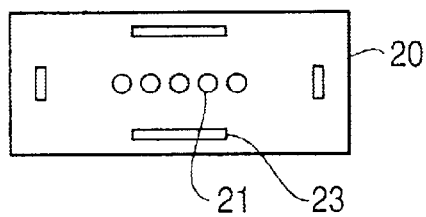
Figure 3D:
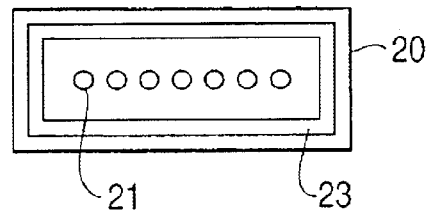
Figure 3E:
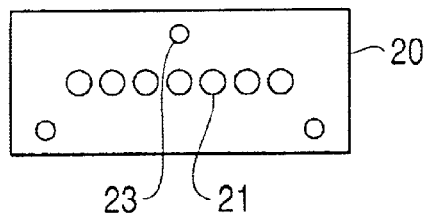

Alternative fully constrained configurations are shown in FIGS. 3A–3E. In FIG. 3A, the mechanical alignment features 23 includes an alignment feature 23 near each corner of the optics block 20 for insertion into the corners of the aperture 28. Thus, each feature abuts two sidewalls of the aperture. In FIG. 3B, there are a plurality of features 23 on either side of the optical elements 21. In FIG. 3C, there are features 23 on each side of the optical elements 21. Each of these features will abut two sidewalls of the aperture. FIG. 3D shows a single, continuous alignment feature 23 completely surrounding the optical elements 21 in the plane of the top surface of the optics block 20, to abut with the sidewalls of the aperture. FIG. 3E illustrates three posts 23. The two posts in the corners will abut the corners of the aperture, and thus each abut two side walls of the aperture. These two posts would constrain the optics block 20 in the x-direction. The third post on the opposite side of the optical elements 21 is configured to abut a sidewall of the aperture, rendering the optics block fully constrained.

Figure 3F:
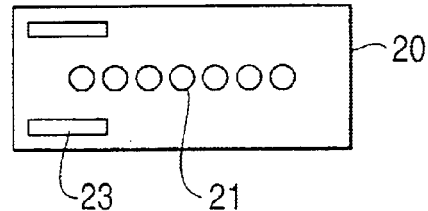
Figure 3G:
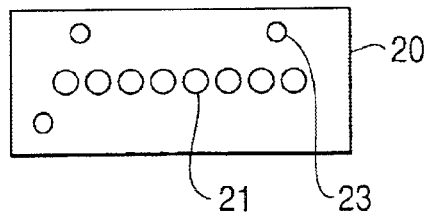

Any of the above embodiments could be rendered not fully constrained if the mechanical alignment features were not configured such that all sidewalls were abutted by at least one feature. Further examples of configuration that are not fully constrained are shown in FIGS. 3F–3G. In FIG. 3F, the features 23 include two bars abutting the same latitudinal sidewall and opposite longitudinal sidewalls. Thus, the optics block 20 is constrained in the y-direction, but translation in the x-direction may be used for the final alignment of the optics block 20 in the aperture. In FIG. 3G, three posts serve as the features 23. Here, two of the posts are to abut only a longitudinal sidewall of the aperture, and the other post is to abut only a latitudinal sidewall of the aperture. Thus, the optics block 20 is not constrained in either the x- or y-direction, and translation in both may be used for the final alignment of the optics block in the aperture.

Numerous other configurations will also be apparent to those skilled in the art. In all of the configurations, the features 23 are to mate with a sidewall 32 of the aperture 28. It is noted that the particular lay out of the optical elements 21 shown herein is for illustration purposes only, as this would clearly be dictated by the configuration of the fibers.

Any of the configurations of mechanical alignment features may be created lithographically, either at the same time the optical elements have been created lithographically or after. Thus, the optical elements 21 on the optics block 20, as well as the alignment features 23, may be mass-produced on a wafer level and then separated to form individual optics blocks. Further, the use of lithography allows the position and size of these features to be very accurately controlled. The features may be etched into the substrate forming the optics block or may be of a different material than the substrate for the optics block. A photoresist, e.g., SU-8, may be used for the mechanical alignment features. A photoresist that can be deposited, e.g., spun on, at fairly thick layers in a single pass, improves manufacturability of the features.

The thicknesses of the above is approximately 100 microns to provide increased stability of the alignment of the optics block and the mechanical interface. The actual thickness used will depend on a height of a bevel, if any, in the aperture. Also, if the features are to be in a different material than that of the substrate for the optics block, such a material must adhere to the substrate well enough to withstand the conditions of incorporation into a system and of the end use of the system. Further, the width of the features must be wide enough to provide this good adhesion to the optics block. The features may have approximately a 1:1 aspect ratio.

Figure 4A:
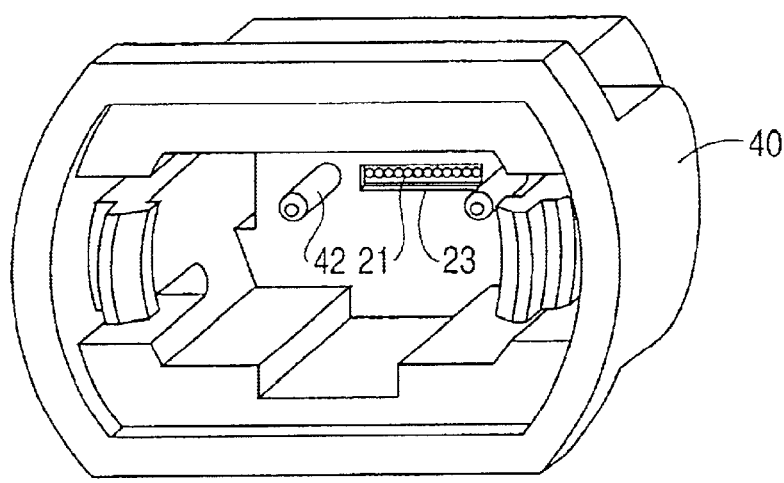
FIG. 4A is an elevational perspective view of another configuration of an interface of the present invention.
Figure 4B:
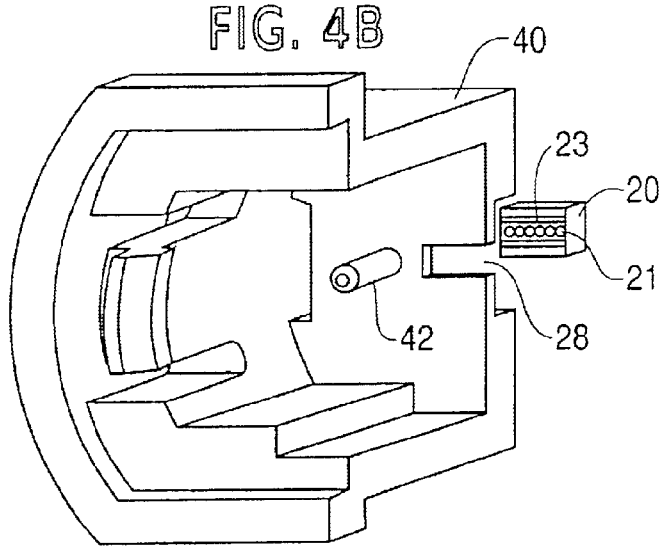
FIG. 4B is an exploded perspective cross-sectional view of the interface of FIG. 4A.
Figure 4C:
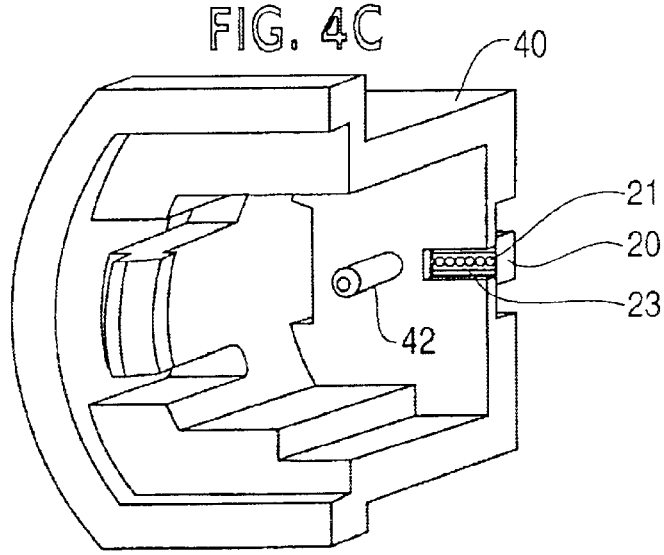
FIG. 4C is a perspective cross-sectional view of the interface of FIG. 4A.

Another configuration illustrating the use of such alignment features and apertures for alignment between the optics block and the mechanical interface is shown in FIGS. 4A–4C. Here, the mechanical interface 40 also serves as a receptacle, i.e., receiving the housing 10 rather than being flush with it, as in FIGS. 1 and 2. Also, as can be seen therein, rather than providing holes 26 for the pins to be inserted, the alignment pins 42 themselves may be molded into the mechanical interface 40. In this configuration, the mechanical interface may be plastic. These alignment pins may then be used to align the fibers to the optics block as before. If these alignment pins extend out of the other side of the mechanical interface, they may be used to align to other elements of the system, e.g., the bench 16 or the substrate 18 shown in FIG. 1. Again, the features 21 on the optics block 20 mate with the aperture 38 of the mechanical interface 42. As in FIG. 1, the features 21 are bars extending along the optical elements 21.

Thus, the interface system of the present invention allows the mechanical and optical interfaces to be optimized for their respective uses, while allowing good passive alignment between the optical and mechanical interfaces in a highly manufacturable configuration. The dimensions of the aperture may be measured using back lighting, facilitating the use of the aperture as part of the alignment system.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by appended claims and their legal equivalents, rather than by examples given.

What is claimed is:

1. An interface system between an opto-electronic device and a fiber in a housing, the interface system comprising:

an optics block having at least one optical element formed therein for coupling light between the fiber and the opto-electronic device;

a mechanical interface which aligns and mates the housing and the optics block, the mechanical interface being separate from the optics block and the housing, wherein at least part of the mechanical interface is disposed between the optics block and the housing, wherein the mechanical interface includes a first surface to be positioned adjacent to the housing and a second surface, opposite the first surface, to be positioned adjacent to the optics block, the mechanical interface including an aperture between the optics block and the housing, light being transmitted between the optics block and the fiber through the aperture; and mechanical alignment features on the optics block, the mechanical alignment features protruding from the optics block, at least one mechanical alignment feature on the optics block abutting with at least one sidewall of the aperture.

2. The interface system of claim 1, wherein the mechanical alignment features are formed lithographically.

3. The interface system of claim 1, wherein the mechanical alignment features are at least approximately 100 microns high.

4. The interface system of claim 1, wherein the mechanical alignment features are made of a photoresist.

5. The interface system of claim 4, wherein the photoresist is SU-8.

6. The interface system of claim 1, wherein the sidewalls of the aperture are tapered.

7. The interface system of claim 1, wherein the mechanical alignment features surround the optics on the optics block.

8. The interface system of claim 7, wherein the mechanical alignment features completely surround the optics on the optics block.

9. The interface system of claim 7, wherein the mechanical alignment features extend longitudinally along the optics block.

10. The interface system of claim 1, wherein the mechanical alignment features are in corners of the optics block.

11. The interface system of claim 1, wherein the mechanical alignment features are in a longitudinal center of the optics block.

12. The interface system of claim 1, wherein the mechanical interface is not transparent to light being coupled between the opto-electronic device and the fiber.

13. The interface system of claim 1, wherein the mechanical alignment features are of a different material than the optics block.

14. The interface system of claim 1, wherein the mechanical interface further comprises alignment features for aligning the mechanical interface with the housing.

15. The interface system of claim 1, wherein each sidewall of the aperture is abutted by a mechanical alignment feature.

16. The interface system of claim 1, wherein at least two sidewalls of the aperture are abutted by a mechanical alignment feature.

17. The interface system of claim 1, wherein only three sidewalls of the aperture are abutted.

18. The interface system of claim 1, wherein the mechanical alignment features on the optics block allow translation of the optics block when in the aperture.

* * * * *